United States Patent [19]

Williams

[11] Patent Number: 5,094,140

[45] Date of Patent: Mar. 10, 1992

[54] MISSILE LAUNCHER ASSEMBLY

[75] Inventor: John W. Williams, Bellevue, Wash.

[73] Assignee: TechTeam, Inc., Huntsville, Ala.

[21] Appl. No.: 667,642

[22] Filed: Mar. 11, 1991

[51] Int. Cl.$^5$ ............................................. F41F 3/06
[52] U.S. Cl. ................................. 89/1.819; 89/1.806
[58] Field of Search ................ 89/1.819, 1.806, 1.807, 89/1.58

[56] References Cited

U.S. PATENT DOCUMENTS

| | | | |
|---|---|---|---|
| 3,040,629 | 6/1962 | Duncan et al. | 89/1.819 |
| 3,134,300 | 5/1964 | Shlesinger | 89/1.819 |
| 3,983,785 | 10/1976 | Dissmeyer et al. | 89/1.819 |
| 4,392,411 | 7/1983 | Minkler | 89/1.819 |
| 4,660,456 | 4/1987 | Griffin et al. | 89/1.819 |

*Primary Examiner*—David H. Brown
*Attorney, Agent, or Firm*—Phillips & Beumer

[57] ABSTRACT

A missile launcher assembly for launching a missile from an airborne, shipborne, or ground-installed platform has a carriage mounted for limited forward and rearward movement on a track provided on the platform. The carriage supports the missile in fixed relation to the carriage by hooks having an inclined surface that engage mating surfaces within the missile body and a pivotally mounted restraint pawl that engages a surface within the missile body so as to keep the missile from sliding off the hooks. A camming surface engageable with a pawl-restraining rocker link is located on the platform so that when the missile and carriage are moved forward upon ignition of the missile motor, the front end of the link is cammed downward, forcing its rear end upward and releasing the pawl. The pawl, upon being released, rotates upward out of the missile body, allowing the missile to slide off the hook. The assembly avoids the use of appendages projecting from the missile and of mechanisms for retracting of such appendages, reducing the drag of the free-flying missile and the complexity and weight of retracting mechanisms.

12 Claims, 4 Drawing Sheets

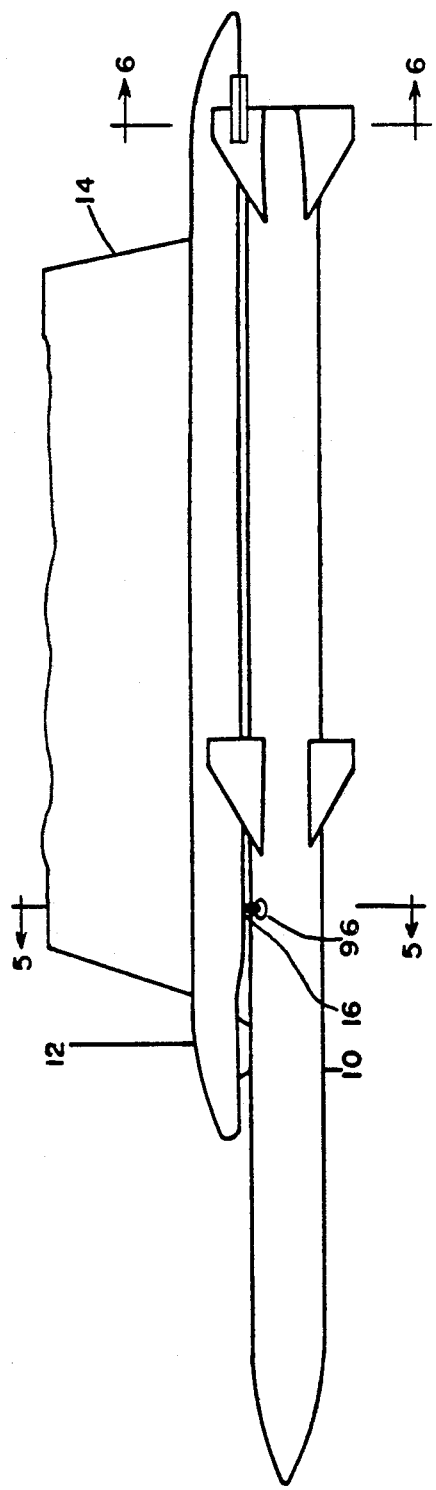
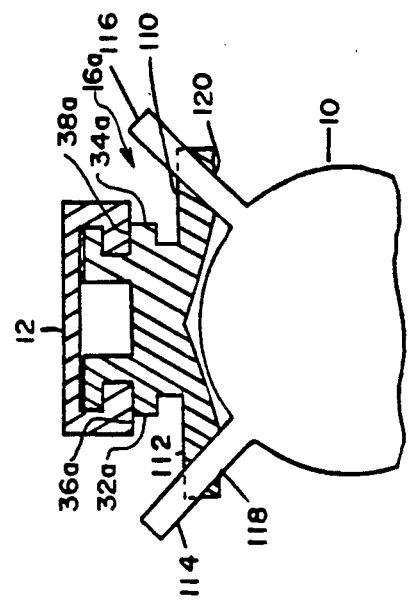
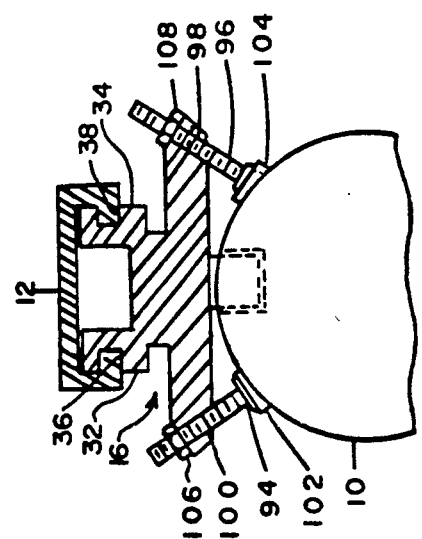

MISSILE LAUNCHER ASSEMBLY

ORIGIN OF THE INVENTION

This invention was made with government support under a Small Business Innovation Research (SBIR) program contract awarded by the Department of the Air Force. The Government has certain rights in this invention.

FIELD OF THE INVENTION

This invention relates generally to missile launchers and more particularly to apparatus for launching missiles from a rail launcher/platform which may be airbore, shipborne, and/or groundbased.

BACKGROUND OF THE INVENTION

Certain types of missiles are generally guided from support platforms at launch by permanent appendages to missiles such as hangers or slides that run in rails on a platform. This arrangement provides initial directional control for the missile and ensures proper separation between the missile and its launch platform during the critical initial phase of launch. The missile appendages, however, create unwanted aerodynamic drag, both asymetric and otherwise, resulting in reduced range and impaired accuracy of the missile. The need for eliminating projecting appendages, and the unwanted drag that they produce, from missiles has become increasingly important as missile sophistication has increased, and missiles with higher speeds, longer range, and greater accuracy are being developed for operation at supersonic and hypersonic speeds. Elimination of missile appendages, therefore, has become essential.

Various approaches to providing missile launching systems that avoid the use of permanently projecting appendages on the missile are disclosed in prior art patents. U.S. Pat. Nos. 3,967,529, issued July 6, 1976, to Ingle et al., and 4,170,923, issued Oct. 16, 1979, to Kilmer, utilize retractable lug assemblies with spring-biased mechanisms that cause a projecting lug to be forced into a seating space within the body of the missile upon being launched. U.S. Pat. No. 4,392,411, issued July 12, 1983, to Miakler, discloses a mechanism having guide rails and guide claws and a supporting bolt that is retracted into the missile body upon launch by means of a spring. While effective in reducing drag, these devices add weight to the missile and reduce its efficiency. A launcher assembly employing a jettisonable fitting for engaging the guide rail of a launcher so as to avoid aerodynamic drag is disclosed in U.S. Pat. No. 3,146,670, issued Sept. 1, 1964, to Suydam. This presents a disadvantage in that any jettisoned fitting at an airborne launch platform can be ingested by the aircraft engine(s) or hit other vital parts, resulting in hazardous flight conditions. It is desired to provide a missile launcher in which the missile is supported without use of projecting appendages or lug retracting mechanisms built into the missile.

SUMMARY OF THE INVENTION

This invention is directed to a missile launching assembly comprising a fixed platform, a captive carriage slidably mounted on the platform for movement within limits from a rearward, missile-engaging position to a forward release position, means provided on the carriage for removably engaging a missile at cavities within the missile body, and means disposed on the platform for releasing the missile engagement means upon forward movement of the carriage produced by ignition of the missile motor. In a preferred embodiment for an airborne system, the carriage has downwardly extending hooks having forward ends with a downwardly and forwardly inclined upper surface that is brought into contact with a mating surface inside the missile and arranged such that unless the missile is restrained from moving forward with respect to the carriage, the missile would slide off the hooks and fall downward. Restraint of such movement by the missile prior to and after ignition until release from the launcher is provided by a pawl pivotally mounted on the carriage and having a lower leg with a surface that engages a generally vertical mating surface in a cavity within the missile body, blocking forward movement until the pawl is pivoted upward out of the missile body by camming action of a rocker arm supported by the carriage. The rocker arm has a rear end engageable with the upper leg end of the pawl and a forward end engageable with a ramp disposed in the path of the carriage at the forward end on restraining tracks of the launch platform. Upon ignition of the missile motor, the missile and attached carriage slide forward, and at the end of the run the forward end of the rocker arm is forced downward by contact with a forwardly inclined surface of the ramp, thus pivoting the rearward end of the rocker arm upward and out of engagement with the pawl, allowing the pawl to rotate out of the missile body. This allows the missile to be released by sliding off the hooks. Tracks or guide rails are provided on the platform for engagement by the carriage, with the carriage being stopped and restrained by means on the platform after release of the missile.

Launch assemblies embodying the invention operate effectively without requiring the presence of projecting appendages on the outside of the missile surface or mechanisms for retracting lugs or hooks to a position within the missile. Instead, the missile is supported at locations within cavities inside the missile body, and no projections are involved. Aerodynamic drag is avoided, while minimizing requirements for added weight or provision of complicated mechanisms within the missile.

It is, therefore, an object of this invention to provide a missile launcher assembly that avoids the use of missile support appendages projecting outward from the missile surface.

Another object is to provide means for launching a missile from a platform that eliminates the need for drag-producing projections on the missile surface.

Yet another object is to provide a missile launcher assembly wherein mechanism in the missile for retraction of supporting lugs are not required.

Another object is to provide a missile launcher assembly that minimizes requirements for added weight in the missile for supporting its being launched.

Another object is to provide apparatus for controlled self-launching of a missile from a rail launcher without use of an ejection system.

Other objects and advantages of the invention will be apparent from the following detailed description.

BRIEF DESCRIPTION OF THE DRAWINGS

FIG. 1 is a side view showing a missile supported by a platform and carriage embodying the invention.

FIG. 5 is a sectional view taken along line 5—5 of FIG. 1 showing braces securing the missile against swaying.

FIG. 6 is a sectional view taken along line 6—6 of FIG. 1 showing an alternate arrangement of restraint by attachment of carriage arms to missile fins for stabilization.

DESCRIPTION OF THE PREFERRED EMBODIMENT

Figure 2:
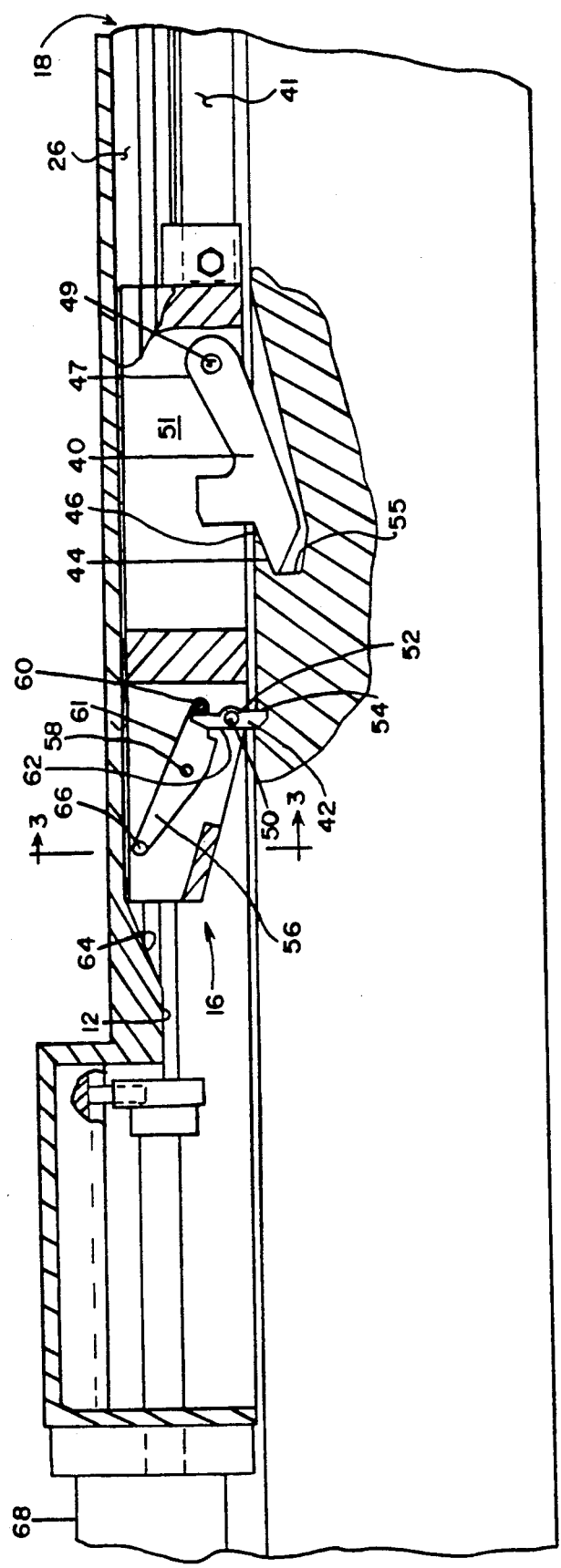
FIG. 2 is a fragmentary side view, partly broken away, showing a missile in supported position immediately prior to release.

Referring to FIGS. 1 and 2 of the drawings, a missile 10 is shown supported below a launch platform 12, which in turn is fixedly secured to a strut portion 14 connected to an airplane (not shown) or any other weapon platform. On an airplane, the launcher may be connected underneath the wing or at other locations as desired. A slidable carriage having carriage portions 16, 16a and disposed between the missile and the launch platform supports the missile as shown, releasing it by mechanisms described below when the missile and carriage are moved forward upon ignition of the missile motor.

Figure 3:
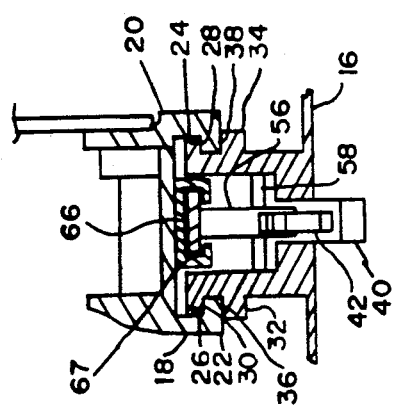
FIG. 3 is a sectional view taken along line 3—3 of FIG. 2 and showing details of the carriage and platform rail.

The launcher has a projecting rail 18 (FIG. 3) that extends in front to rear direction on the launcher. Rail 18 has side members 20 and 22 spaced apart from one another, and longitudinally extending slots 24 and 26 therein in facing alignment with one another, the slots being rectangular or any other suitable shape in cross section and defining bottom surfaces 28 and 30 that provide tracks on which the carriage rides. Carriage portion 16, 16a have outwardly projecting guide claws 32, 34, and 32a, 34a, respectively, mated with the slots 24 and 26 of rail 18 and having surfaces 36 and 38 and surfaces 36a, 38a, respectively, that slide on surfaces 28 and 30 of the guide rail.

Figure 2A:
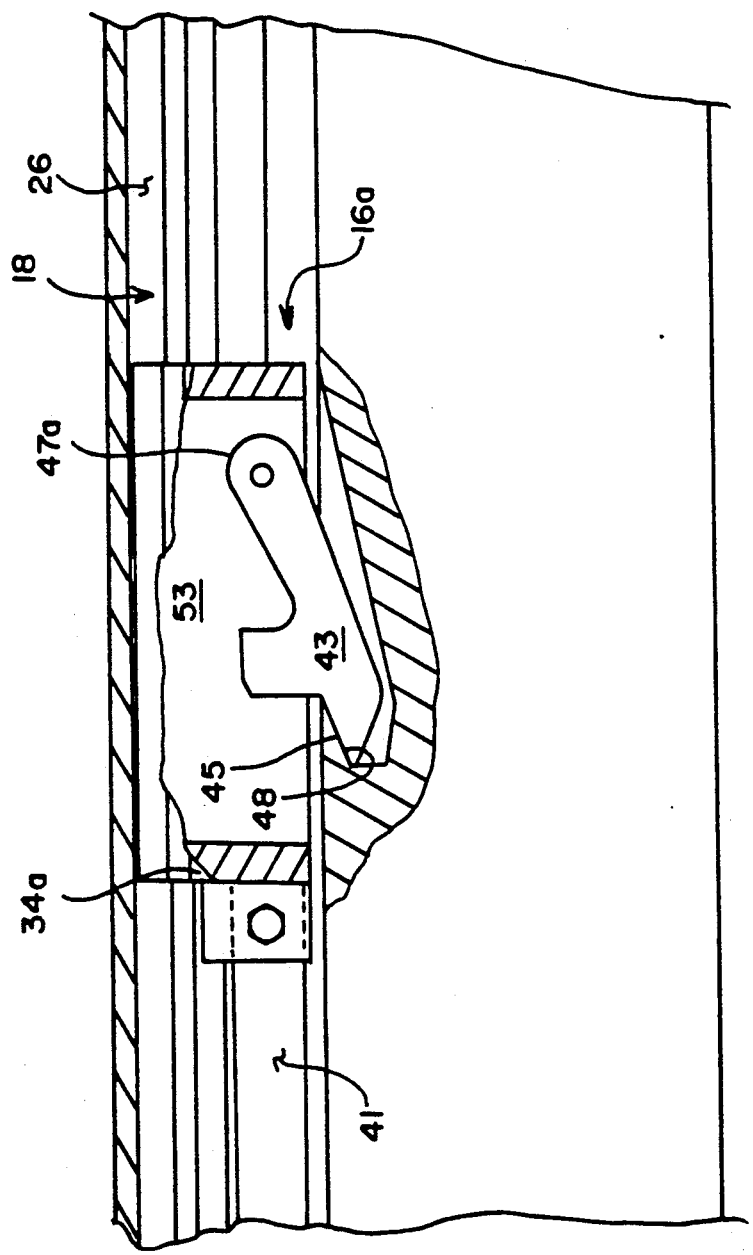
FIG. 2a is a fragmentary side view, partially broken away, of details of construction of an aft hook portion of a carriage of the present invention.
Figure 4:
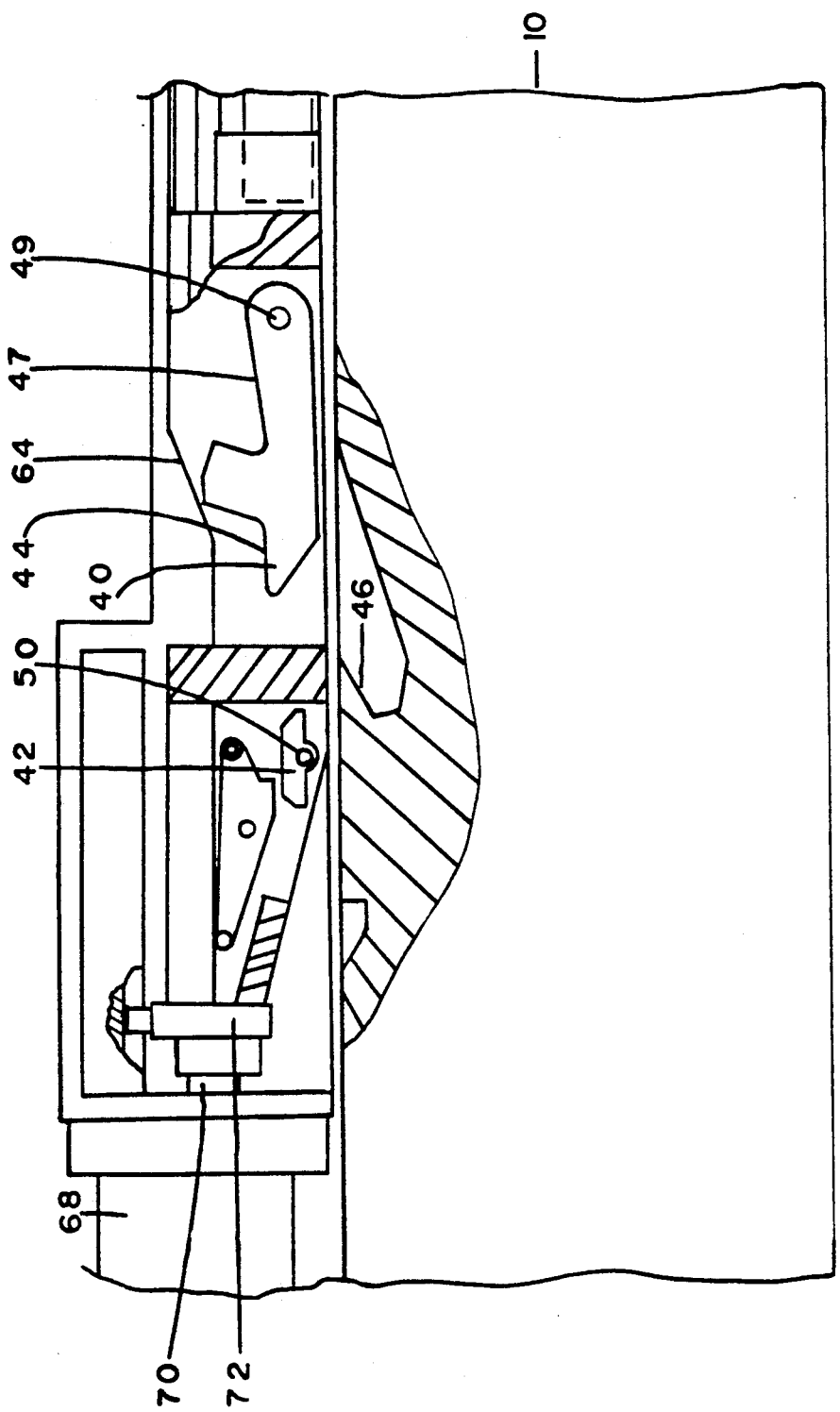
FIG. 4 is a fragmentary side view, partly broken away, showing the position of missile-supporting elements upon disengagement.

As shown in FIGS. 2, 2a, and 4, the missile is removably secured to the carriage by means of hooks 40, 43 in carriage portions 16, 16a and a restraint pawl 42 in carriage portion 16. At least two hooks in carriage portions 16, 16a, and spaced apart along the length of the carriage are preferably employed to support the missile, with hook 43 positioned to the rear of hook 40. A link 41 is provided for spacing of the hook assemblies 51, 53 in carriage portions 16, 16a to match the spacing of missile cavities 55 and 57 into which the hooks are deployed.

The hooks are projectible downward from the carriage, inclined in the forward direction and define flat, inclined surfaces 44 and 45 on the top side of the forward end thereof that comes into face-to-face contact with mating surfaces 46, 48 respectively, of cavities 55 and 57 defined in a bulkhead in the missile body. Rearward ends 47, 47a of the hooks are pivotally mounted on pins 49, and 49a supported by the carriage. In order for the missile to be supported by engagement of the hooks and mating surface in the missile body, the carriage and missile body must be locked together to prevent the missile from sliding off the hooks. This is accomplished by restraint pawl 42 pivotally mounted on the carriage portion 16 around pivot pin 50. Pawl 42, when engaged as shown in FIG. 2, has a vertically extending surface 52 in flush contact with a mating vertical surface 54 of an internal slot defined in a bulkhead in the missile. Restraint of the pawl in its engaged position and its disengagement upon ignition of the missile are controlled by rocker link 56 pivotally mounted on pin 58 in the carriage portion 16 above the pawl. The rocker link has a transversely extending pin 60 at its rearward end 61 that engages end 62 of the pawl, preventing surface 52 of the pawl from rotating forward until released. Rocker link 56 has a transversely extending head 66 that is, until the missile release point is reached, engaged in slot 67 (FIG. 3) in projecting rail 18. A downwardly inclined ramp surface 64 is provided on rail 18 for engagement with the forward end 66 of rocker link 56 when the carriage has moved forward to the release point after missile ignition. At the release point, forward end 66 of rocker link 56 is cammed downward by ramp surface 64, causing its rearward end 61 to be pivoted upward, disengaging pin 60 from and freeing pawl 42. Missile acceleration forces, until now contained by pawl 42, rotate pawl 42, allowing the missile to slide forwardly freely, rotating hooks 40, 43 out of the missile body. The missile is then free to accelerate away from the carriage without restraint or uncontrolled directional change as shown in FIG. 4.

The carriage, upon ignition of the missile motor, moves from its rearward position as shown in FIG. 2 to a forward position shown in FIG. 4. In order to cushion the impact of the carriage upon impacting the platform in its forward position, a shock absorber 68 may be connected to the forward end of the platform. The shock absorber may comprise a hydraulic or pneumatic shock absorber of conventional construction or a reloadable shock absorbing cartridge.

Sway braces stabilizing the missile against lateral movement in flight are shown in FIG. 5. The braces may take the form of bolts 94, 96 diagonally extending through holes 98, 100 in side portions of carriage portion 16. The bolts have enlarged heads 102, 104 engaging the surface of the missile from each side so as to restrain it from lateral movement with respect to the carriage. Nuts 106, 108 secure the bolts in position.

A means alternate to that shown in FIG. 5 for stabilizing the missile against in-flight movement is shown in FIG. 6. In this embodiment, carriage portion 16a is provided with laterally extending arms 110, 112 that are engageable at their outer ends with radially extending fins 114, 116 of the missile. The arms ride in slots 118, 120, with mating surfaces of the arms engaging surfaces within the slots, securing the missile from moving laterally with respect to the carriage prior to ignition.

The number of hooks mounted on the carriage and the number of slots provided in the missile to receive them for operation as described above may be varied depending on the length and weight of the missile. In general, at least two hooks, spaced along the length of the missile and carriage, would be employed. Preferably, only one pawl is employed, regardless of the number of hooks, in order to avoid any problems with synchronizing the operation of the pawls.

While the invention is described above in terms of a specific embodiment, it is not to be understood as limited thereby but is limited only as indicated by the appended claims. In particular, other mechanisms for disengaging the missile from the carriage upon forward movement of the carriage may be used. In addition, controls and/or safety devices for the missile and carriage release may be provided and integrated with the ignition command for the missile.

I claim:

1. A missile launcher assembly comprising:

a fixed platform;

a carriage slidably secured to said platform by means allowing limited forward and rearward movement of the carriage with respect to the platform;

missile support means secured to said carriage and including at least one support member engageable with a receptable within the body of a missile and locking means for retaining the same in engaged position when the carriage is at its rearmost position; and means for disengaging said locking means upon forward movement of the carriage comprising a fixed portion of said platform arranged to be contacted by said locking means when the carriage moves forward and to cause the locking means to be moved to a disengaged position upon making such contact.

2. A missile launcher assembly as defined in claim 1 including a pair of sway braces mounted at side edges of said carriage and disposed diagonally downward so that lower ends of the braces are engageable with the missile at locations spaced apart circumferentially from the engageable surfaces in the missile.

3. A missile launcher assembly as defined in claim 1 including means for removably securing said carriage to fins of a missile to restrain the missile from lateral movement prior to release from the launcher.

4. A missile launcher assembly comprising:

a platform fixedly attached underneath a supporting body and adapted to support a missile for launching, said platform having a longitudinally extending rail provided with opposed, downwardly extending side members with opposed longitudinal slots in interior regions thereof defining tracks;

a carriage including opposed guide claws on an upper region of said carriage, said guide claws slidably engaged with said tracks; and releasable missile support means mounted on said carriage for securing a missile when the carriage is in its rearmost position and releasing the missile upon ignition and movement forward, comprising:

at least one hook having at its forward end a downwardly and forwardly extending surface arranged for engaging a mating surface within the body of said missile, at least one restraint pawl mounted on said carriage so as to be movable into the body of the missile and including a surface for engaging a mating surface within the missile for restraining the missile from moving forward and prematurely sliding off said hook when the carriage is in its rearmost position, rocker link means for retaining said pawl in engagement with said missile, and ramp means on said rail for engaging said rocker link means and responsive to engagement of said rocker link means with said ramp means, disengaging said pawl and removing the same from within the body of the missile upon movement of the carriage so as to reach a predetermined position.

5. A missile launcher assembly as defined in claim 2 wherein said pawl is rotatably mounted on an axis transverse to the carriage and has a lower end providing said missile-engaging surface and an upper end for engagement with pawl-retaining means, said pawl being rotatable from a vertical position in which said lower end projects into said missile, engaging said missile surface, to a horizontal position within the carriage and out of the path of the missile.

6. A missile launcher assembly as defined in claim 5 including a plurality of hooks and a pawl for engagement with a plurality of mating surfaces in cavities within the missile body.

7. A missile launcher assembly as defined in claim 5 including shock absorbing means disposed on said platform for being contacted by and retaining the carriage at the end of its forward movement.

8. A missile launcher assembly as defined in claim 5 wherein said supporting body is a strut.

9. A missile launcher assembly as defined in claim 5 wherein said means for retaining said pawl in engagement with said missile comprises a rocker link mounted on said carriage on an axis transverse to the carriage and having a rearward end engageable with the forward end of said pawl from above the pawl and a forward end arranged to be forced downward upon making contact with disengaging means on the platform, thereby forcing the rearward end of the rocker link upward and out of contact with the pawl, allowing the pawl to move to its horizontal position and releasing the missile.

10. A missile launcher assembly as defined in claim 9 wherein said means on said platform for disengaging the pawl comprises a downwardly and forwardly inclined ramp surface mounted on the platform in the path of the forward end of said rocker link and arranged to be contacted by the same upon forward movement of the carriage.

11. A missile launcher assembly as defined in claim 10 wherein said track immediately to the rear of the inclined surface has a short length of non-inclined surface to allow slight forward movement of the carriage before contact is made between the forward end of the rocker length and the inclined surface.

12. A missile launcher assembly as defined in claim 11 wherein the forward end of the rocker link has a transversely mounted pin at its upper edge for contacting said inclined surface.

* * * * *